US006895047B2

(12) United States Patent
Shiro

(10) Patent No.: US 6,895,047 B2
(45) Date of Patent: May 17, 2005

(54) METHOD OF ENCODING MOVING PICTURE DATA

(75) Inventor: Ohba Shiro, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 808 days.

(21) Appl. No.: 09/917,756

(22) Filed: Jul. 31, 2001

(65) Prior Publication Data

US 2002/0075958 A1 Jun. 20, 2002

(30) Foreign Application Priority Data

Nov. 8, 2000 (JP) ........................................ 2000-340660

(51) Int. Cl.⁷ ............................................... H04N 7/12
(52) U.S. Cl. ............................. 375/240.01; 375/240.26
(58) Field of Search ........................ 348/206; 345/422; 375/240.01, 240.26

(56) References Cited

U.S. PATENT DOCUMENTS

| | | | | |
|---|---|---|---|---|
| 4,942,473 A | * | 7/1990 | Zeevi et al. | 348/281 |
| 4,945,500 A | * | 7/1990 | Deering | 345/422 |
| 5,315,098 A | * | 5/1994 | Tow | 235/494 |
| 5,420,966 A | * | 5/1995 | Silverbrook | 345/422 |
| 5,774,178 A | * | 6/1998 | Chern et al. | 348/206 |
| 6,181,375 B1 | * | 1/2001 | Mitsui et al. | 348/240.99 |
| 6,198,768 B1 | * | 3/2001 | Yamaguchi et al. | 375/240.01 |
| 6,587,158 B1 | * | 7/2003 | Adams et al. | 348/716 |

OTHER PUBLICATIONS

Zaibi, Rabi, et.al., Small Moving Object Detection in Video Sequences, Jun. 2000, Proceedings of 2000 IEEE International Conference on Acoustics, Speech, and Signal Processing, vol. 6, pp. 2071–2074.☐☐☐☐*

* cited by examiner

Primary Examiner—Chris Kelley
Assistant Examiner—Matthew J Haney
(74) Attorney, Agent, or Firm—Staas & Halsey LLP

(57) ABSTRACT

Pixel data in the same position within the frames is fetched in order of the time series. At the last frame image, the position to fetch pixel image is shifted to that of a neighboring piece of pixel data. Next, pixel data is fetched in order of reverse time series from the last to the first frame image. Subsequently, at the first frame image, the position to fetch pixel data is shifted to that of a neighboring piece of pixel data. This way, a serial data string is constituted by successively fetching pixel data alternately in order of said time series and in order of reverse time series, folding back and forth, the pixel data each being in a same position on each frame image, and the position shifting to a neighboring pixel data each time the fetching reaches a first or a last of the frame images.

22 Claims, 15 Drawing Sheets

METHOD OF ENCODING MOVING PICTURE DATA

BACKGROUND OF THE INVENTION

1. Field of the Invention

The present invention relates to a method of coding a moving image, a method of decoding a moving image, a moving image coding device, a moving image decoding device, a recording medium storing a program for coding a moving image, a recording medium storing a program for decoding a moving image, and a recording medium storing coded moving image data. In particular, the present invention relates to technologies for coding and decoding, with high efficiency and facility, moving image data composed of a plurality of frame images.

2. Description of the Related Art

In recent years, network systems such as the Internet are on their way to being established as an infrastructure. Under these circumstances, motion picture and other digital deliveries, digital broadcasting, visual telephone, video conference system, and the like have been realized. Generally, in transmitting moving image data of digital form, moving images are compressed (coded) at the transmitting side for higher transmission efficiency. At the receiving side, the compressed data is extracted (decoded) into the original moving image data.

The following is a list of conventionally-used techniques for coding and decoding digital image data. The techniques (1)–(4) below are also frequently used to code still image data as well as moving image data.

(1) Entropy Coding

This is a technique of assigning codes of different lengths (variable length code) in accordance with the frequencies of occurrence of data. This includes Huffman coding, DPCM (Differential Pulse Coded Modulation) coding, and predicting coding.

(2) Conversion Coding

This is a technique in which longer codes are assigned to lower frequency components and shorter codes are assigned to higher frequency components out of the space frequency components of an image obtained through a two-dimensional Fourier transform, taking advantage of the fact that higher frequency components have smaller dispersions.

(3) Vector Quantization

This is a technique in which image signal waveforms per se are regarded as vectors, and the presence of deviations in the frequencies of occurrence of vectors due to image correlation is utilized for increasing the coding efficiency.

(4) DCT Coding

This is a technique of subjecting block images to a discrete cosine transform (DCT) to cut off high frequency components. This is employed in JPEG (Joint Photographic image coding Experts Group) and MPEG (Moving Picture coding Experts Group).

(5) Background Differential Coding

This is a technique of removing motionless background data from moving image data composed of a plurality of frame images, so as to transmit only the data of target objects.

(6) Interframe Coding

This is a technique of coding differences with respect to previous frame images out of moving image data that consists of a plurality of frame images.

(7) Motion Compensative

This is an extended technique for interframe coding, in which the motions of target objects are detected from among consecutive frames so that images shifted by the amounts of the motions are used as interframe predictable images.

(8) Recognition Coding

This is a technique of tracking, as in broadcasting a ball game where only the motions of players (target objects) change against a constant background, the feature vectors (positions, sizes, shapes, textures, or the like) of the players to code the tracks of the target objects.

In the techniques (1) to (4) above, coding is performed for each frame image; therefore, moving image data composed of a plurality of frame images is low in compression efficiency. In the techniques (5) to (8) above, the correlation among frame images arranged in a time series is utilized to improve the compression efficiency, whereas the coding requires an enormous amount of information or necessitates pre-recognition of the target object(s). Moreover, the compression rates are constant irrespective of the characteristics of the moving image data (which frequency component is contained to what extent). Accordingly, frame images containing a high proportion of high frequency components tend to deteriorate in image quality while frame images containing a high proportion of low frequency components tend to drop in compression efficiency.

The following is a list of problems in the individual techniques.

(1) Entropy Coding

Sufficient compression efficiency cannot be obtained unless the target data is widespread.

(2) Conversion Coding

There is an enormous amount of computation to be done.

(3) Vector Quantization

It is unsuitable for coding that requires real-time processing such as visual telephone because of longer coding time.

(4) DCT Coding

Since frame images are divided into blocks to reduce the amount of computation, block noise occurs in images that include rotation and other complex motions.

(5) Background Differential Coding

There is an increased amount of information when a number of target objects exist or when target objects move violently.

(6) Interframe Coding

There is an increased amount of information when a number of target objects exist or when target objects move violently.

(7) Motion Compensative

For example, MPEG involves a series of I-pictures, B-pictures, and P-pictures. I-pictures can reproduce frame images irrespective of previous and subsequent frame information. B-pictures require previous and subsequent frame information in reproducing frame images. P-pictures require previous frame information in reproducing frame images. Therefore, fast forward and fast reverse necessitate complicated processing. The coding and decoding are hard to process in parallel.

(8) Recognition Coding

Target objects must be recognized in advance.

SUMMARY OF THE INVENTION

An object of the present invention is to code/decode, with high efficiency and facility, moving image data composed of a plurality of frame images.

Another object of the present invention is to reduce a load on a network, compress a communication radio bandwidth, and reduce a load on electronic equipment for coding/decoding digital moving image data.

Another object of the present invention is to prevent the occurrence of block noise even in images that contain complicated motions.

Another object of the present invention is to execute the coding/decoding of moving image data composed of a plurality of frame images at high speed.

Another object of the present invention is to perform coding at an optimum compression rate in accordance with the characteristics of moving image data, thereby optimizing the processing time required for the coding.

According to one of the aspects of the method of coding a moving image, the moving image coding device, the recording medium storing a program for coding a moving image, and the recording medium storing coded moving image data in the present invention, moving image data composed of a plurality of frame images arranged in a time series is coded.

Initially, pixel data in the same position within the frames is fetched in order of the time series from the first frame image of the time series to the last frame image of the time series. At the last frame image, the position to fetch pixel image is shifted to that of a neighboring piece of pixel data. Next, in this position, pixel data is fetched in order of reverse time series from the last frame image to the first frame image. Subsequently, at the first frame image, the position to fetch pixel data is shifted to that of a neighboring piece of pixel data. In this way, a serial data string is constituted by successively fetching pixel data alternately in order of the time series and in order of reverse time series, folding back and forth, the pixel data each being in a same position on each of the frame image, and the position shifting to a neighboring pixel data each time the fetching reaches a first or a last of the frame images. Subsequently, the serial data string is compression coded into coded data.

In moving image data, the correlation between pieces of pixel data on frames arranged in a time series is far stronger than the correlation between pieces of pixel data within a frame. Therefore, a serial data string retaining extremely strong correlation is constituted by connecting pieces of pixel data in same positions in the direction of the time series or in the direction of reverse time series, and, at both end of frame images of the moving image data, connecting neighboring pixels which have relatively strong correlation. Since neighboring pieces of pixel data in the serial data string retain strong correlation in data value, it is possible to increase the compression efficiency of the coding and decrease the data amount of the coded data.

The coding of serial data, not two-dimensional data, allows reduction in the computing load in the coding. Since frame images are not divided into a plurality of blocks, in principle, no block noise occurs.

As a result, it is possible to reduce the load on the moving image coding device for coding moving image data (in particular, the load on CPU or other computers). In the case of transmitting the coded data, the load on the transmission path can be reduced. In radio communication, the communication radio bandwidth can be compressed. In recording the coded data on a recording medium, a greater amount of coded data can be recorded.

These coding processes are effected, for example, by mounting the recording medium storing a program for coding a moving image onto a personal computer or the like, and reading the program for coding a moving image to operate the personal computer as the moving image coding device. Alternatively, in the case of a moving image coding device as a digital video device as such, the program for coding a moving image is pre-written to a ROM in the device.

The coded data is recorded on a hard disk or the like of the moving image coding device, or recorded on a DVD (Digital Video Disk) or the like.

According to another aspect of the method of coding a moving image in the present invention, the number of frame images constituting the moving image data is made variable. Frame information indicating the number of frame images is added to the serial data string, and this data is compression coded into coded data. The number of frames can be changed in accordance with the power of the coding or margin in the processing time, so that the coding is performed optimally. An increase in the number of frames can lower the number of divided moving image data, therefore keeping the drop in the image quality upon extraction at minimum.

According to another aspect of the method of coding a moving image in the present invention, the serial data string is divided into a plurality of sub serial data strings. The plurality of sub serial data strings is compression coded into respective pieces of coded data. Accordingly, the processing units for coding can be made smaller to reduce the load of the coding.

For example, linked data of the plurality of pieces of coded data can be further compress coded for an improved compression rate. Alternatively, the plurality of sub serial data strings can be compression coded in parallel to reduce the time required for the coding.

According to another aspect of the method of coding a moving image in the present invention, moving image data composed of a plurality of color frame images arranged in a time series is coded. The pixel data of the frame images consists of a plurality of kinds of color information. The serial data string is formed according to kind of color information. Therefore, the coding of color moving image data can be greatly improved in compression efficiency through the use of the strong correlation in the direction of the time series. Moreover, the compression rate for the serial data of a kind of color information can be set higher than the compression rate for the serial data of another kind of color information to increase the overall compression rate, minimizing the amount of the coded data.

Besides, the serial data strings formed according to kind of color information may be divided into a plurality of sub serial data strings each, so that these sub serial data strings are compression coded into respective pieces of coded data. The serial data strings or the sub serial data strings can be compression coded in parallel to reduce the time required for the coding.

According to one of the aspects of the method of decoding a moving image, the moving image decoding device, and the recording medium storing a program for decoding a moving image in the present invention, coded data generated by the method of coding a moving image described above is restored into original moving image data. Initially, the coded data is decoded to constitute a serial data string. The serial data string is laid so as to fold back and forth at lengths each having the number of frame images as a unit. Next, pixel data along a direction perpendicular to the direction the pixel data runs in time series, is fetched as pieces of pixel data of a same time. The fetched pixel data is arranged into predetermined positions of frames. Then, frame images are constituted in order of the time series to restore the original moving image data. In this way, the coded data coded at high compression efficiency can be restored to its original moving image by a simple method.

According to another aspect of the method of decoding a moving image in the present invention, frequency components are obtained from the serial data string. When there are more high frequency components than a predetermined value, the compression rate of the serial data string is decreased. When there are less high frequency components than a predetermined value, the compression rate of the serial data string is increased. Changing the compression rate in accordance with the frequency components of the serial data string can optimize the image quality and the compression efficiency of the restored moving image in good balance.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Hereinafter, embodiments of the present invention will be described with reference to the drawings.

Figure 1:
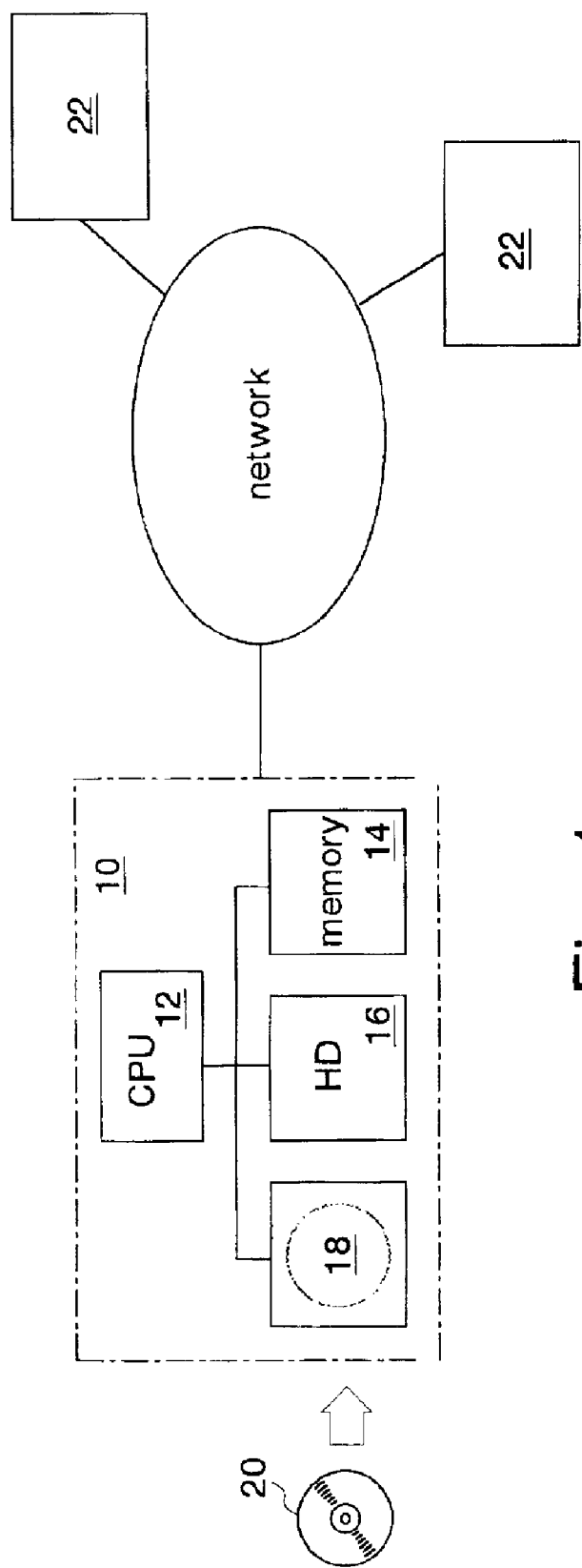
FIG. 1 is an explanatory diagram showing a first embodiment of the method of coding a moving image, the moving image coding device, and the recording medium storing a program for coding a moving image.

FIG. 1 shows a first embodiment of the method of coding a moving image, the moving image coding device, and the recording medium storing a program for coding a moving image in the present invention.

In the diagram, a personal computer 10 is connected to a network through a telephone line or the like. The personal computer 10 includes a CPU 12, as well as a memory 14, hard disk 16, and CD-ROM drive 18 to be controlled by this CPU 12.

A CD-ROM 20 storing a program for coding a moving image can be mounted on the CD-ROM drive 18. After the CD-ROM 20 is mounted on the CD-ROM drive 18, the personal computer 10 downloads the program for coding a moving image, recorded on the CD-ROM 20, to the hard disk 16 under an instruction input from a keyboard or the like (not shown). Through this operation, the personal computer 10 becomes capable of compression coding moving image data taken by a digital video camera or the like. That is, the personal computer 10 functions as a moving image coding device.

The moving image data is transferred, for example, from the digital video camera (not shown) connected to the personal computer 10 to the hard disk 16 through an IEEE-1394 interface. The moving image data on the hard disk 16 is compression coded into coded data by the method to be described later. The coded data is written to the hard disk 16. After this, the coded data is transmitted to communication apparatuses 22 connected to the network, through telephone lines or the like when required.

Figure 2:
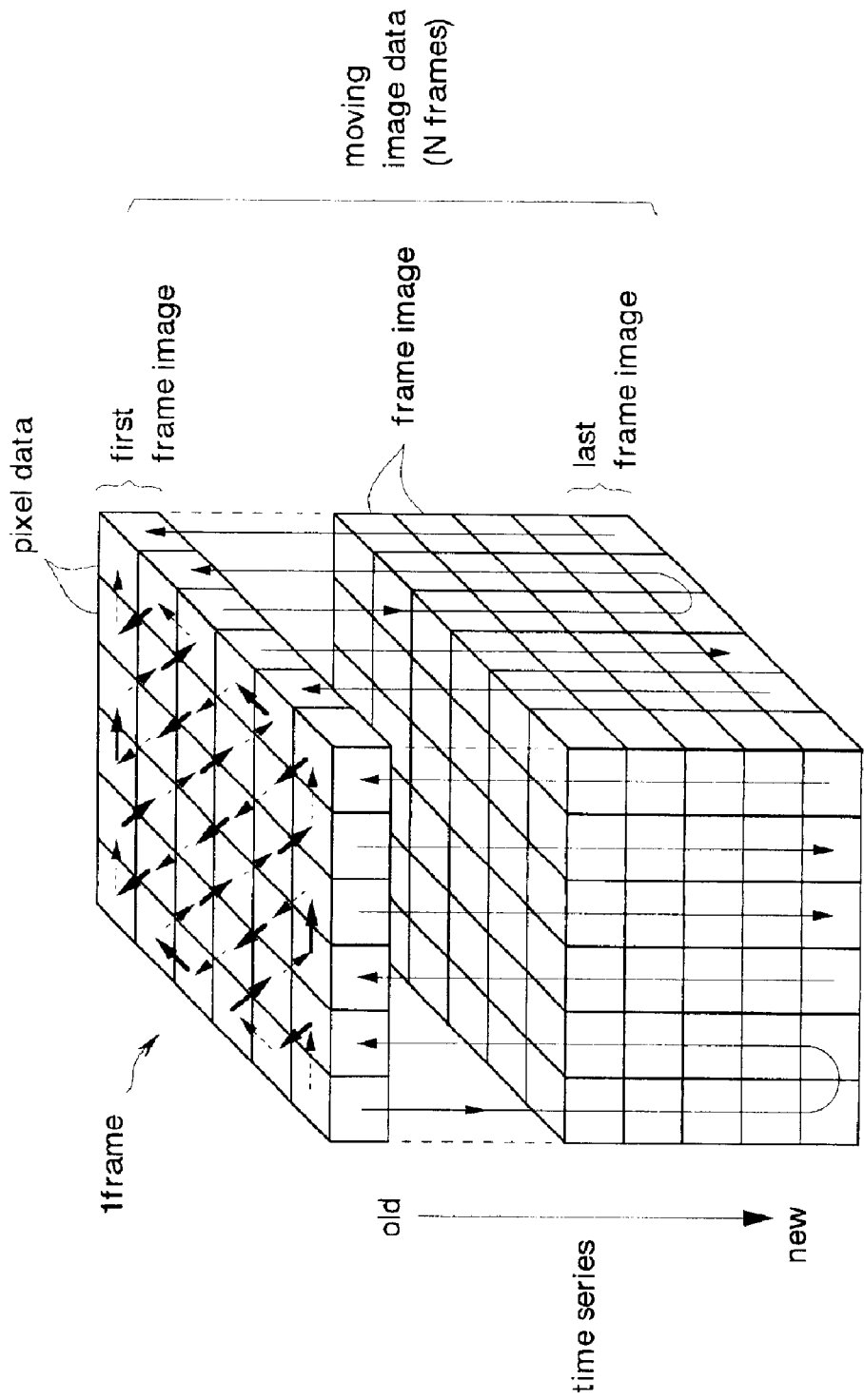
FIG. 2 is an explanatory diagram showing the principles of the compression coding of FIG. 1.

FIG. 2 shows the principles of the compression coding in the present embodiment.

The moving image data is composed of N frame images arranged in order of a time series. The frame image consists of pieces of pixel data arranged in a matrix. The moving image data is converted into a serial data string before coding. Hereinafter, description will be given of the method for generating the serial data string.

Initially, pixel data in a same position (arrangement) on the frames is fetched successively in order of the time series from the frame image of the oldest time (the first frame image) to the frame image of the newest time (the last frame image). At the last frame image, the position to fetch the pixel data is shifted to that of a neighboring piece of pixel data.

Then, in this position, pixel data is fetched in reverse order of the time series from the last frame image to the first frame image. Subsequently, at the first frame image, the position to fetch the pixel data is shifted to that of a neighboring piece of pixel data. The fetching position at the first frame image is sequentially shifted according to the thick arrows shown on the first frame image in the diagram. The fetching position at the last frame image is sequentially shifted according to the dashed arrows shown on the first frame image in the diagram. In other words, a serial data string is generated while shifting the position to fetch pixel data in a zigzag fashion (meanderfashion) at the first and last frame images, from the lower left to the upper right in the diagram.

Generally, in moving image data, the correlation between pieces of pixel data in the frames arranged in time series is far stronger than the correlation between pieces of pixel data within the respective frames. In the present embodiment, for the sake of maximum retention of this relationship, pieces of pixel data in the same positions are connected to one another in the direction of the time series or the reverse direction of the time series while neighboring pixels which have relatively strong correlation are connected to each other at both end frame images of the moving image data. That is, the serial data string described above is constituted to retain the extremely strong correlation of the moving image data.

Figure 3:
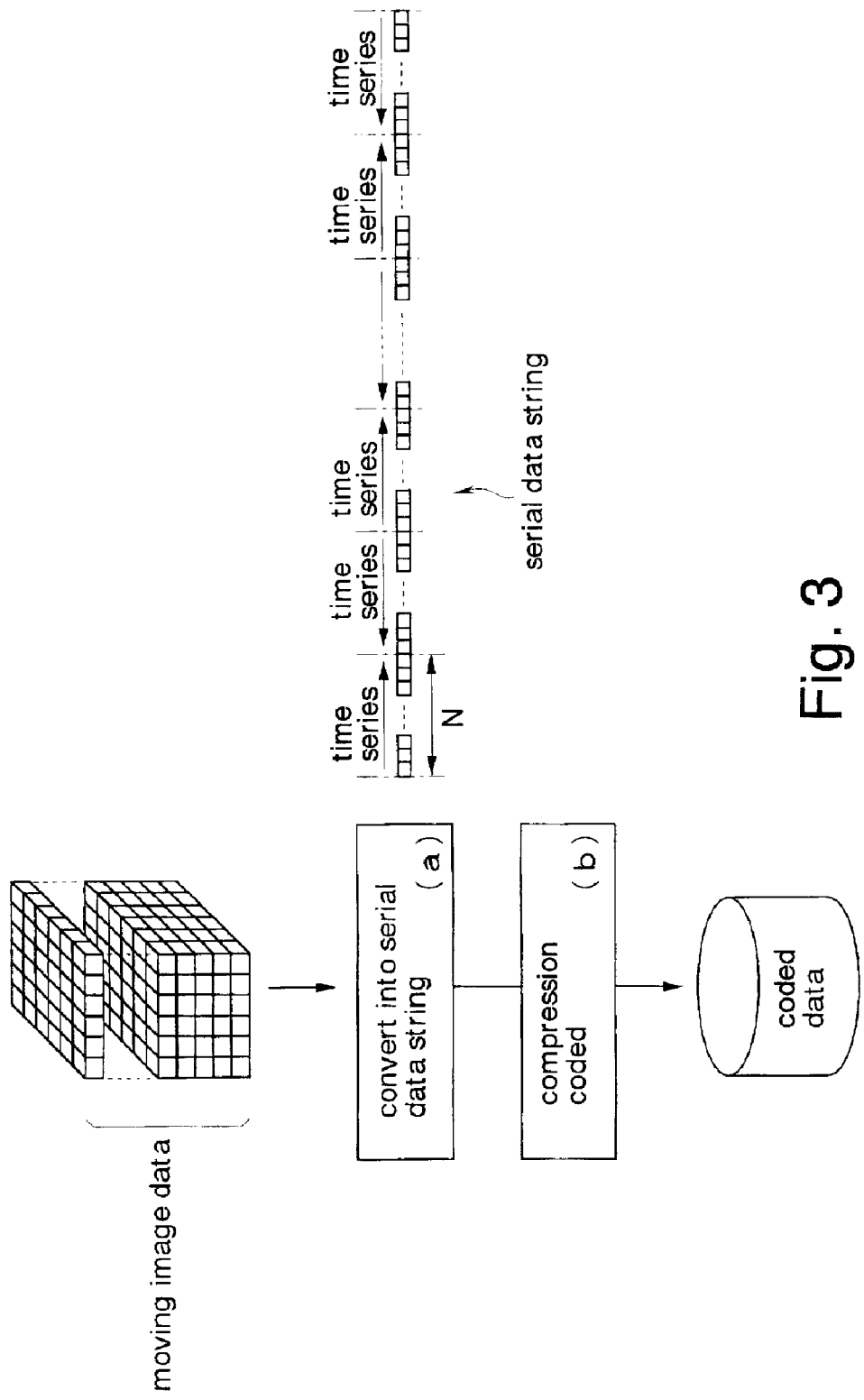
FIG. 3 is a processing flow for converting moving image data into coded data in the first embodiment of the method of coding a moving image, the moving image coding device, and the recording medium storing a program for coding a moving image.

FIG. 3 shows a processing flow for converting the moving image data into coded data (compressed data).

The moving image data is converted into a serial data string through the procedure described in FIG. 2 (FIG. 3(a)). Here, the serial data string involves a reversal of the direction of the time series at every count N (frame count N).

Next, this serial data string is compression coded to generate coded data (FIG. 3(b)). The compression coding includes, for example, irreversible compression followed by reversible compression. The compression coding is not limited thereto, but may include either reversible compression or irreversible compression alone.

Since the serial data string retains strong correlation, and neighboring pieces of pixel data fall close to each other in data value, the entropy compression effect is extremely high. The absence of two-dimensional data processing allows a reduction in the computing load for coding. Since frame images are not divided into a plurality of blocks, no block noise occurs in principle.

As has been described, in the present embodiment, the compression coding of the serial data string having the strong correlation among neighboring pieces of pixel data allows an enormous increase in compression efficiency. Since the moving image data composed of a plurality of frame images is converted into the serial data string described above, the efficiency of the entropy compression can be improved with an increasing frame count N. As a result, the amount of transmission data can be made smaller, with a reduction in network load.

In contrast to the DCT coding, consideration need not be given to correlation within each frame image (two-dimensional data). This allows a reduction in the computing load for coding. Unlike the recognition coding, target objects need not be recognized in advance. This allows simplification of the coding processing. Accordingly, it is possible to reduce the processing time for coding.

Figure 4:
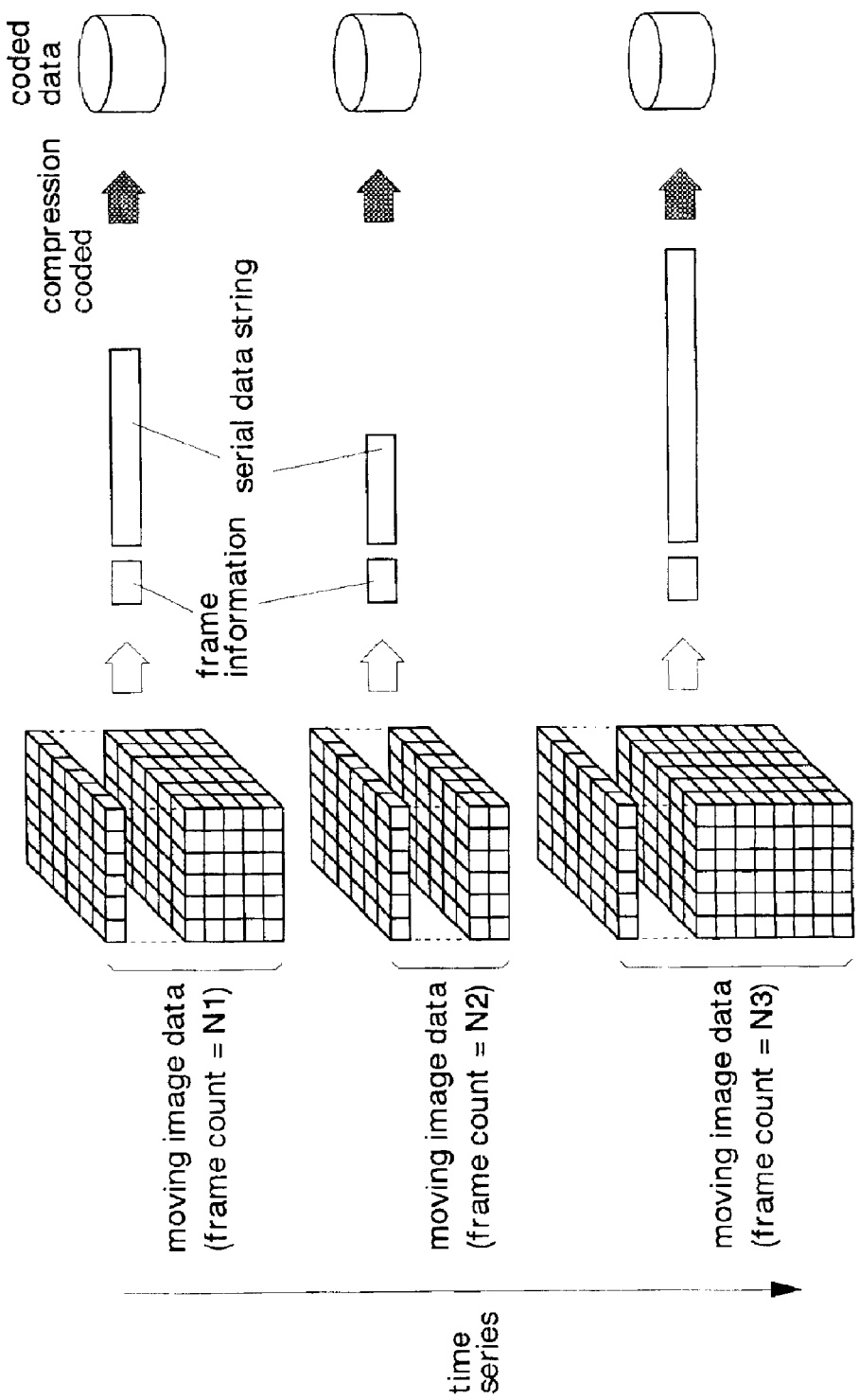
FIG. 4 is an explanatory diagram showing a second embodiment of the method of coding a moving image, the moving image coding device, and the recording medium storing a program for coding a moving image.

FIG. 4 shows a second embodiment of the method of coding a moving image, the moving image coding device, and the recording medium storing a program for coding a moving image in the present invention. In this embodiment, the program for coding a moving image differs from that of the first embodiment (FIGS. 1–3). Other configurations in the embodiment are identical to that of FIG. 1.

In this embodiment, the number of frames of the frame images constituting moving image data is made variable. In this example, the number of frames varies to N1, N2, and N3 in a time-series order. The number of frames is, for example, increased when the load of compression coding on the CPU 12 shown in FIG. 12 can be made greater, and decreased when the load cannot be made greater. In other words, the number of frames is increased when the CPU 12 has a sufficient computing power or a margin in the computing time.

The moving image data is converted into a serial data string through the procedure described in FIG. 2. Then, frame information indicating the number of frames is added to this serial data string before compression coding. Greater number of frames improves the compression efficiency. Moreover, an increase in number of frames lowers the number of partitions of the moving image data, minimizing a drop in the image quality upon extraction. Since the coding algorithm is the same even for smaller number of frames, the image quality after extraction can be maintained constant.

This embodiment can offer the same effects as those obtained from the above-described first embodiment of the method of coding a moving image, the moving image coding device, and the recording medium storing a program for coding a moving image. Moreover, in this embodiment, the number of frames of moving image data is made variable. Therefore, moving image data can be compression coded in accordance with the load status of the CPU 12 without lowering the image quality after extraction.

Figure 5:
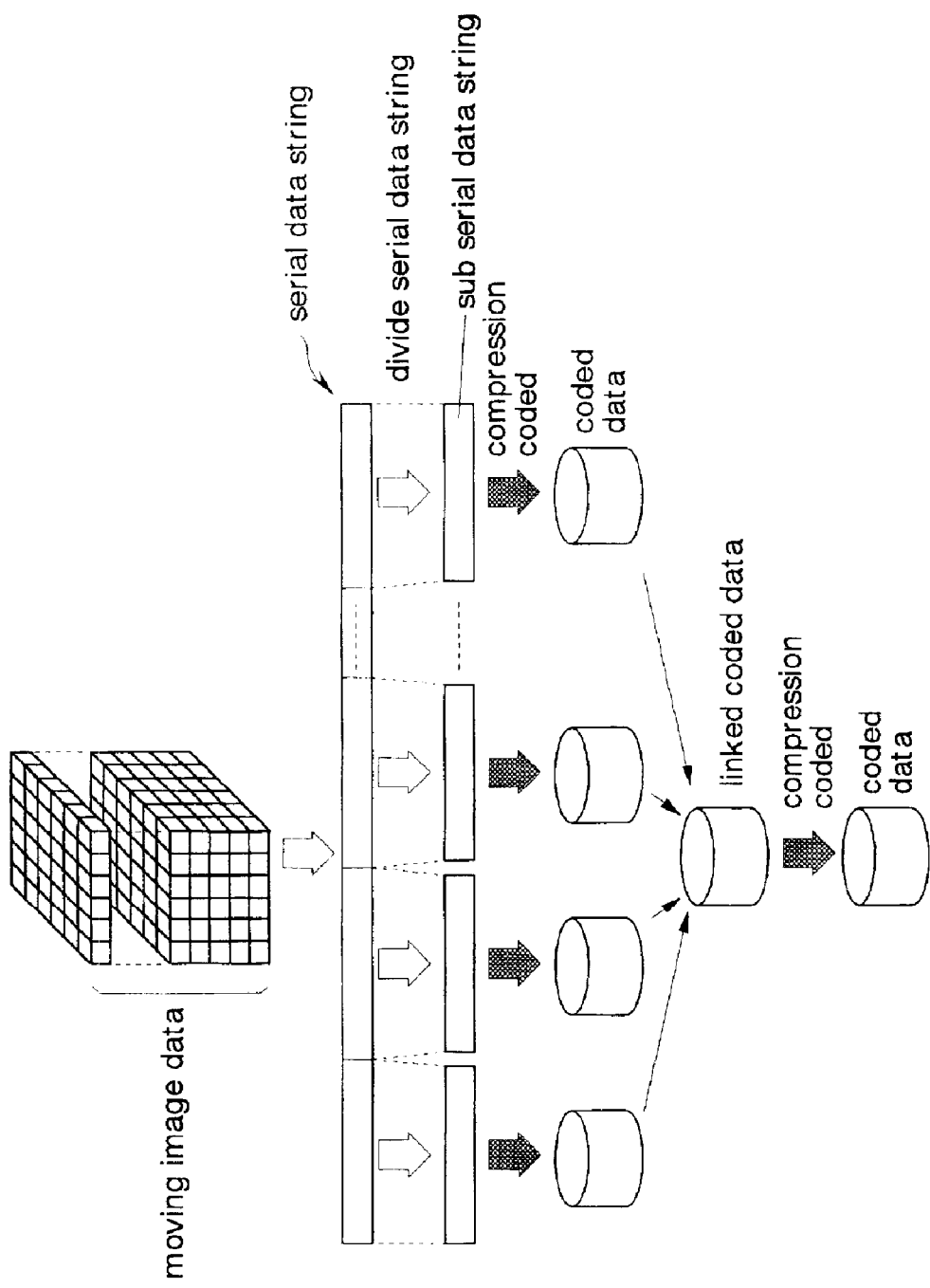
FIG. 5 is an explanatory diagram showing a third embodiment of the method of coding a moving image, the moving image coding device, and the recording medium storing a program for coding a moving image.

FIG. 5 shows a third embodiment of the method of coding a moving image, the moving image coding device, and the recording medium storing a program for coding a moving image in the present invention. In this embodiment, the program for coding a moving image differs from that of the first embodiment (FIGS. 1–3). Other configurations in the embodiment are identical to that of FIG. 1.

In this embodiment, a serial data string is generated as in the first embodiment before the serial data string is divided into a plurality of sub serial data strings. The sub serial data strings are compression coded individually. The compression coding includes, for example, irreversible compression followed by reversible compression. The compression coding is not limited thereto, but may include either reversible compression or irreversible compression alone. The CPU 12 shown in FIG. 1 may process the coding of the sub serial data strings in succession or in parallel. The parallel processing reduces the time required for the coding. The coding of the sub serial data strings reduces the computing load on the CPU 12. The pieces of coded data are linked before further compression coding (reversible compression).

This embodiment can offer the same effects as those obtained from the above-described first embodiment of the method of coding a moving image, the moving image coding device, and the recording medium storing a program for coding a moving image. Moreover, in this embodiment, the serial data string is divided into sub serial data strings. Therefore, the processing units for coding can be made smaller, with a reduction in the load on the CPU 12.

The linking and additional coding of the coded data allows an improvement in compression rate. As a result, the amount of transmission data can made smaller with a further reduction in network load.

Figure 6:
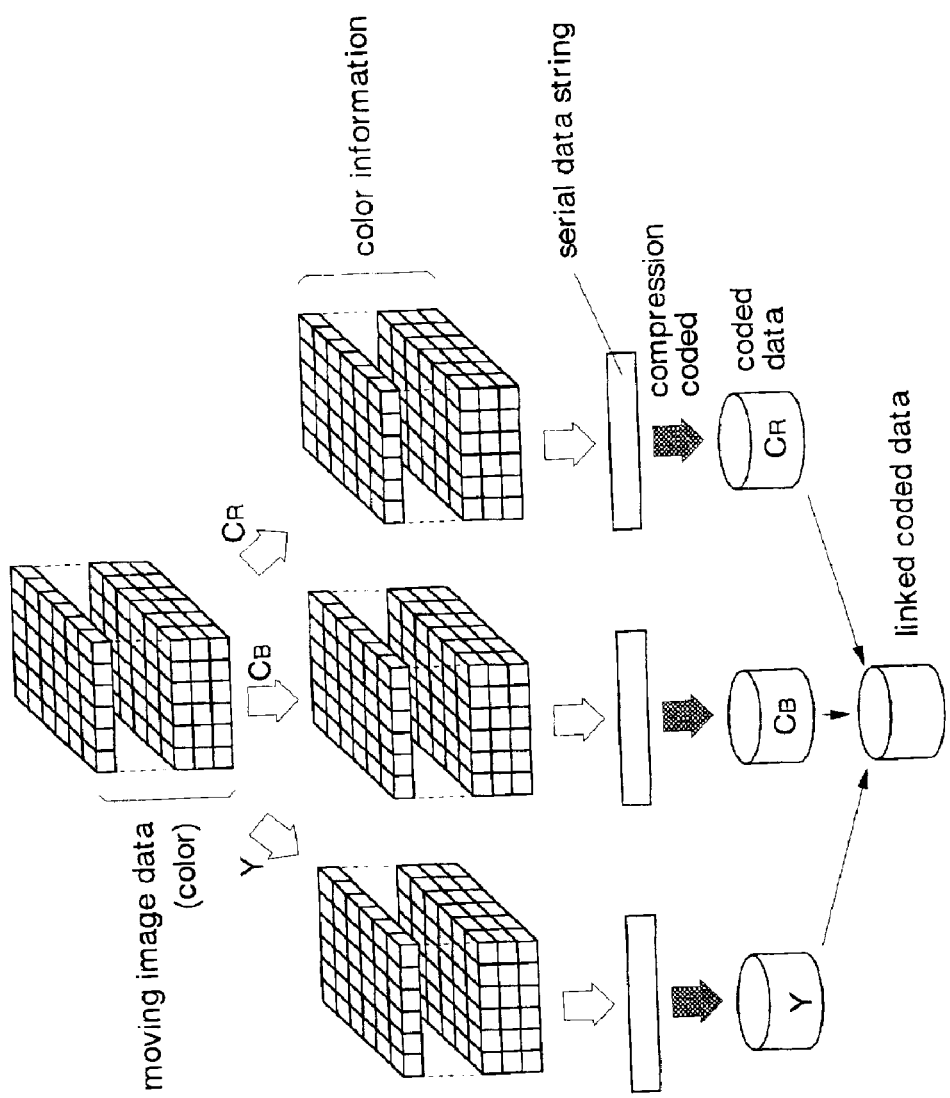
FIG. 6 is an explanatory diagram showing a fourth embodiment of the method of coding a moving image, the moving image coding device, and the recording medium storing a program for coding a moving image.

FIG. 6 shows a fourth embodiment of the method of coding a moving image, the moving image coding device, and the recording medium storing a program for coding a moving image in the present invention. In this embodiment, color moving image data is compression coded, and the program for coding a moving image differs from that of the first embodiment (FIGS. 1–3). Other configurations in the embodiment are identical to that of FIG.

The color moving image data is composed of, for example, a luminance signal Y and color difference signals CB and CR. In this embodiment, pieces of pixel data in the moving image data are initially divided into three kinds of color information (the luminance signal Y and the color difference signals CB and CR). Then, through the same procedure as that of the first embodiment, serial data strings are generated according to kind of color information. The serial data strings are individually compression coded to generate pieces of coded data according to kind of color information. The compression coding includes, for example, irreversible compression followed by reversible compression. The compression coding is not limited thereto, but may include either reversible compression or irreversible compression alone. The CPU 12 shown in FIG. 1 may process the coding of the color information data in succession or in parallel. Here, the compression rates for the data of the color difference signals CB and CR which contain higher proportions of low frequency components as compared with the luminance signal Y, are made higher than the compression rate for the data of the luminance signal Y, thereby minimizing the coded data in data amount. The pieces of coded data are linked to each other, and the linked coded data is transmitted.

This embodiment can offer the same effects as those obtained from the above-described first embodiment of the method of coding a moving image, the moving image coding device, and the recording medium storing a program for coding a moving image. Moreover, in this embodiment, the coding of color moving image data can also be greatly improved in compression efficiency, taking advantage of the strength of correlation in the direction of the time series. Besides, the compression rate can be changed from one kind of color information to another, thereby minimizing the coded data in amount.

Figure 7:
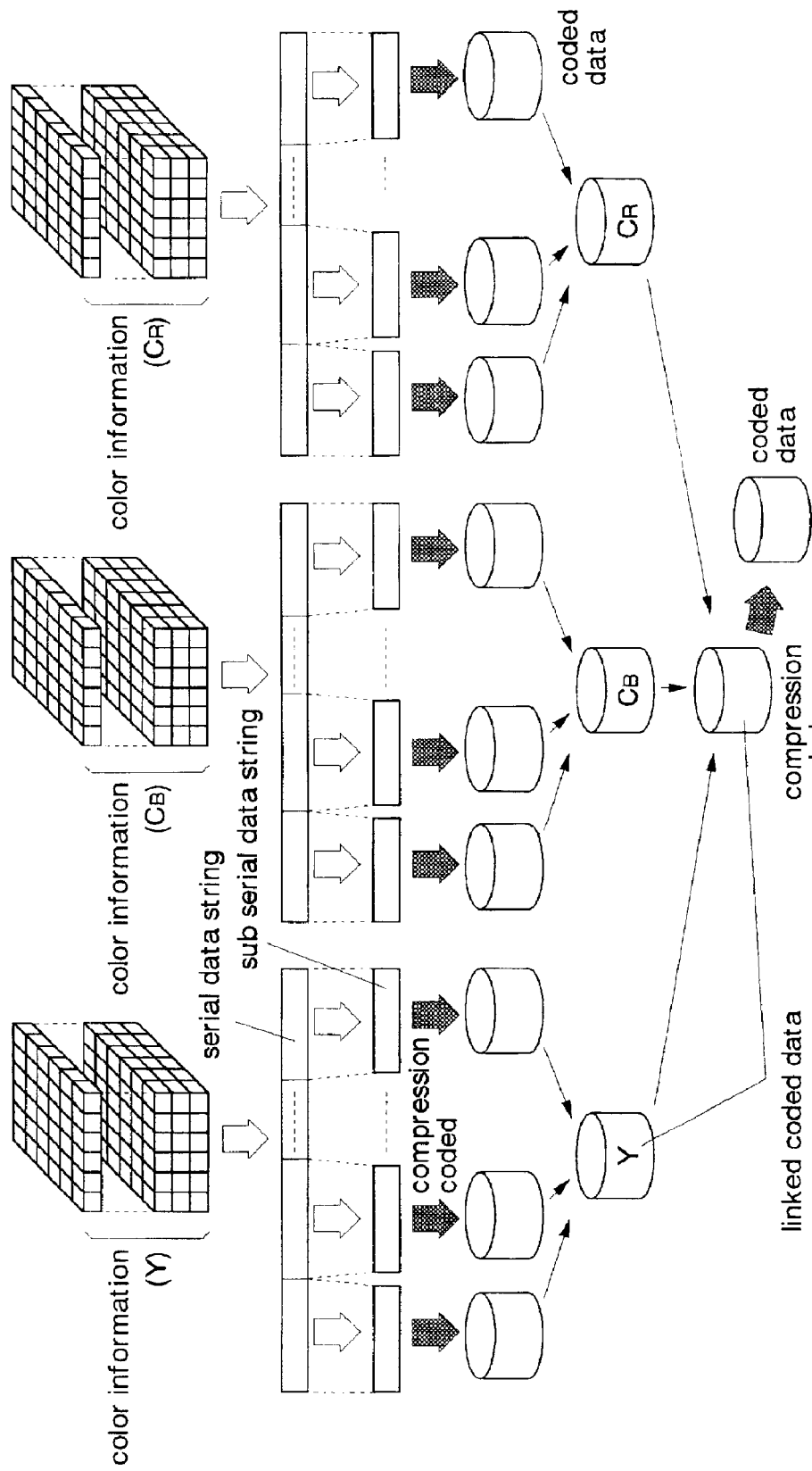
FIG. 7 is an explanatory diagram showing a fifth embodiment of the method of coding a moving image, the moving image coding device, and the recording medium storing a program for coding a moving image.

FIG. 7 shows a fifth embodiment of the method of coding a moving image, the moving image coding device, and the recording medium storing a program for coding a moving image in the present invention. In this embodiment, color moving image data is compression coded, and the program for coding a moving image differs from that of the first embodiment (FIGS. 1–3). Other configurations in the embodiment are identical to that of FIG. 1.

In this embodiment, pieces of data divided into three kinds of color information (a luminance signal Y and color difference signals CB and CR) are initially converted into serial data strings according to kind of color information as in the fourth embodiment. The serial data strings, as in the third embodiment, are divided into a plurality of sub serial data strings for compression coding. The compression coding includes, for example, irreversible compression followed by reversible compression. The compression coding is not limited thereto, but may include either reversible compression or irreversible compression alone. The sizes of the sub serial data strings may be changed in accordance with the frequency characteristics of the respective kinds of color information. Changing the sizes of the sub serial data strings according to kind of color information ensures that the image continuity across the boundaries of pieces of moving image data (blocks) is maintained when the compressed data is extracted at the destination. The CPU 12 shown in FIG. 1 may process the coding of the sub serial data strings in succession or in parallel. Subsequently, the pieces of coded data are linked according to kind of color information. The pieces of linked data are further linked into a single piece of data for compression coding (reversible compression).

This embodiment can offer the same effects as those obtained from the above-described third and fourth embodiments of the method of coding a moving image, the moving image coding device, and the recording medium storing a program for coding a moving image.

Figure 8:
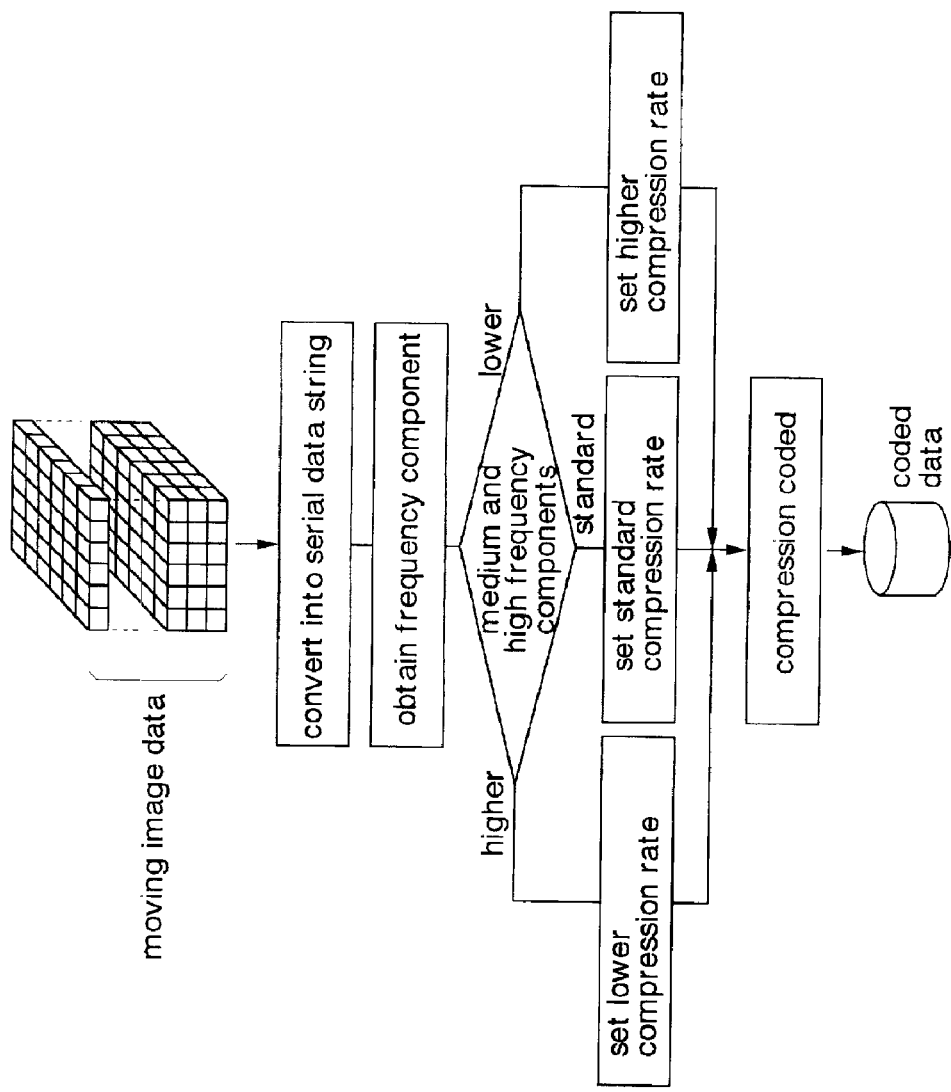
FIG. 8 is an explanatory diagram showing a sixth embodiment of the method of coding a moving image, the moving image coding device, and the recording medium storing a program for coding a moving image.

FIG. 8 shows a sixth embodiment of the method of coding a moving image, the moving image coding device, and the recording medium storing a program for coding a moving image in the present invention. In this embodiment, the program for coding a moving image differs from that of the first embodiment (FIGS. 1–3). Other configurations in the embodiment are identical to that of FIG. 1.

In this embodiment, frequency components are obtained from a serial data string after the serial data string is generated as in the first embodiment. Then, if medium and high frequency components are higher in proportion (the image includes a large amount of motion), the compression rate is set to a lower value. When medium and high frequency components are standard in proportion, the compression rate is set to a standard value. When medium and high frequency components are lower in proportion (the image includes a small amount of motion), the compression rate is set to a higher value. Then, compression coding (irreversible compression) is performed at the set compression rate to generate coded data. Such changing of the compression rate is changed in accordance with the frequency components can improve the image quality of the moving image extracted at the destination when medium and high frequency components are higher in proportion, and can increase the compression efficiency when medium and high frequency components are lower in proportion.

This embodiment can offer the same effects as those obtained from the above-described first embodiment of the method of coding a moving image, the moving image coding device, and the recording medium storing a program for coding a moving image. Moreover, in this embodiment, the compression rate can be changed in accordance with the frequency components of the serial data string so that the image quality and the compression efficiency of the restored moving image are optimized in good balance.

Figure 9:
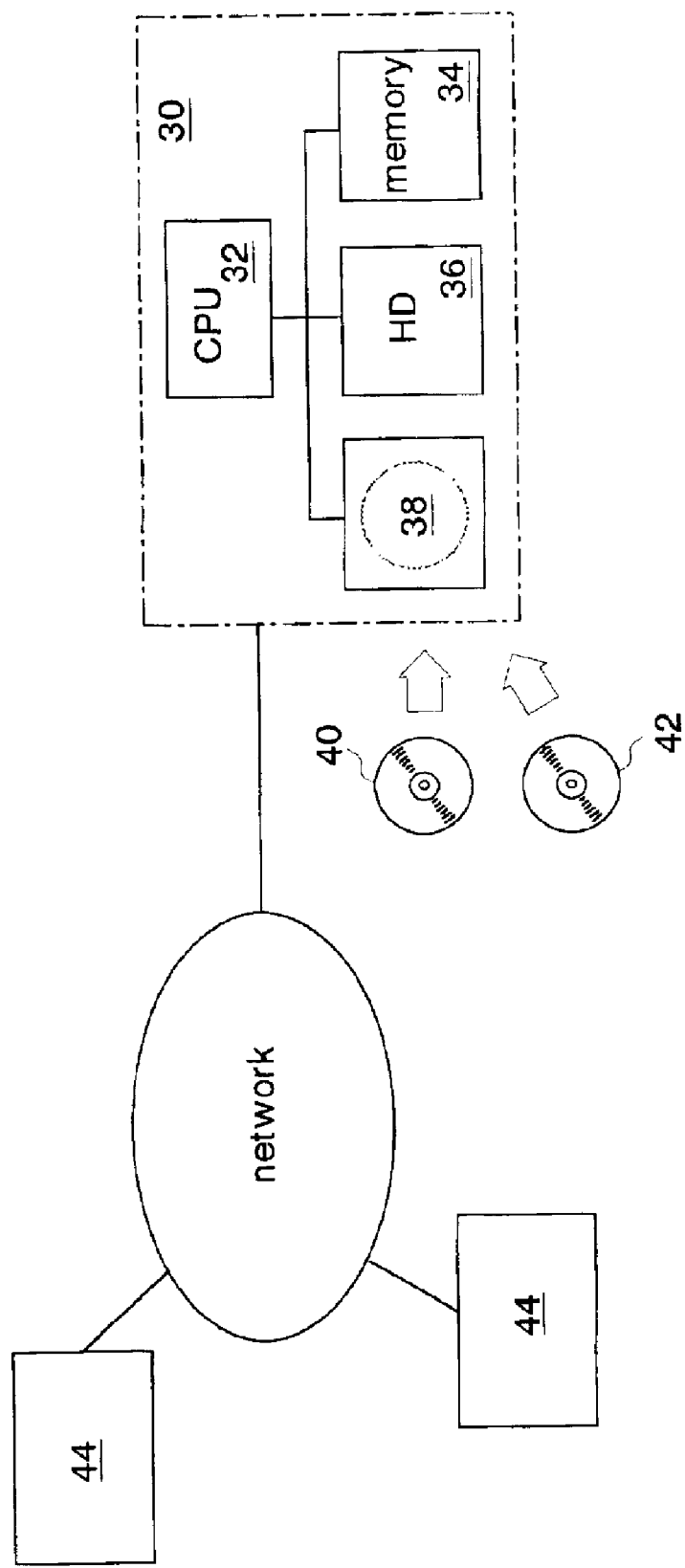
FIG. 9 is an explanatory diagram showing a first embodiment of the method of decoding a moving image, the moving image decoding device, the recording medium storing a program for decoding a moving image, and the recording medium storing coded moving image data.

FIG. 9 shows a first embodiment of the method of decoding a moving image, the moving image decoding device, the recording medium storing a program for decoding a moving image, and the recording medium storing coded moving image data in the present invention.

In the diagram, a personal computer 30 is connected to a network through a telephone line or the like. The personal computer 30 includes a CPU 32, as well as a memory 34, hard disk 36, and DVD-ROM drive 38 to be controlled by this CPU 32. A CD-ROM 40 storing a program for decoding a moving image and a DVD-ROM 42 storing coded moving image data such as a motion picture can be mounted on the DVD-ROM drive 38. After the CD-ROM 40 is mounted on the DVD-ROM drive 38, the personal computer 30 downloads the program for decoding a moving image, recorded on the CD-ROM 40, to the hard disk 36 under an instruction input from a keyboard or the like (not shown). Through this operation, the personal computer 30 becomes capable of reproducing the coded data of the moving image data recorded on the DVD-ROM 42 to be mounted on the DVD-ROM drive 38. That is, the personal computer 30 functions as a moving image decoding device. Here, the coded data recorded on the DVD-ROM 42 is the data that is compressed through the procedure shown in FIG. 3 described above.

The coded data read from the DVD-ROM 42 is written to the memory 34, decoded by the method to be described later, and converted into the original moving image data. The moving image data restored is successively displayed on a display (not shown). Incidentally, the personal computer 30 may receive coded data from communication apparatuses 44 connected to the network, such as another personal computer, through the telephone line or the like. In this case, the personal computer 30 writes the coded data received to the hard disk 36. Then, the coded data written to the hard disk 36 is successively decoded into moving image data.

Figure 10:
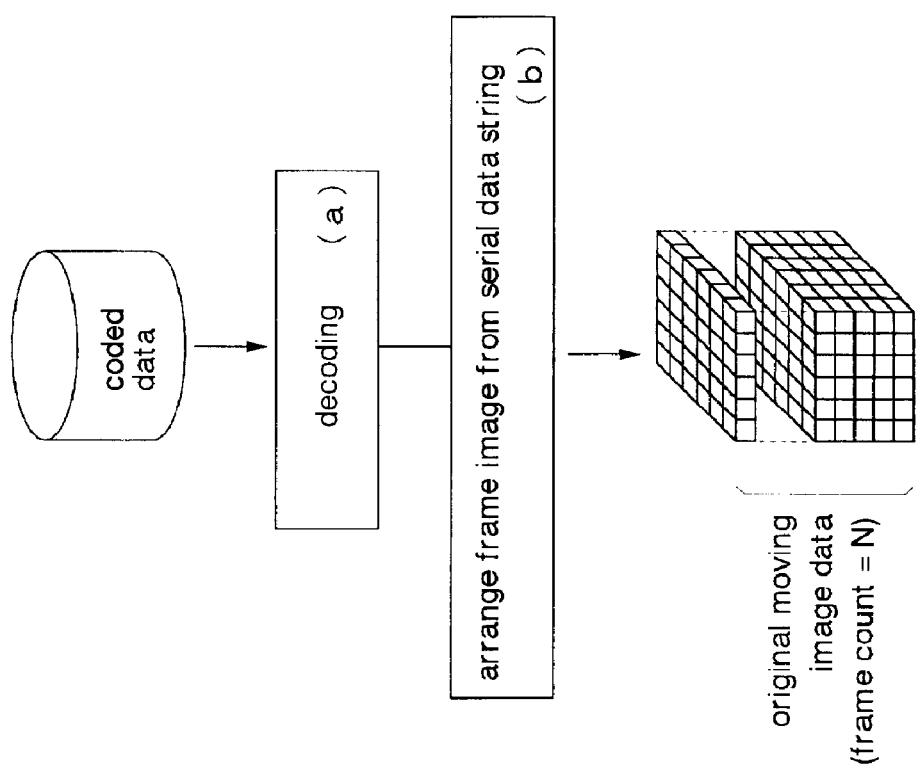
FIG. 10 is a processing flow for coding in the first embodiment of the method of decoding a moving image, the moving image decoding device, the recording medium storing a program for decoding a moving image, and the recording medium storing coded moving image data.

FIG. 10 shows a processing flow for decoding (extracting) the coded data to restore the original moving image data. Initially, the coded data is decoded and converted into the serial data string shown in FIG. 3 (FIG. 10(a)). The coded data has been generated, for example, through irreversible compression followed by reversible compression. Alternatively, the coded data has been generated through either reversible compression or irreversible compression alone.

Next, the serial data string is rearranged by the procedure to be described later, to restore the original moving image data (FIG. 10(b)).

Figure 11:
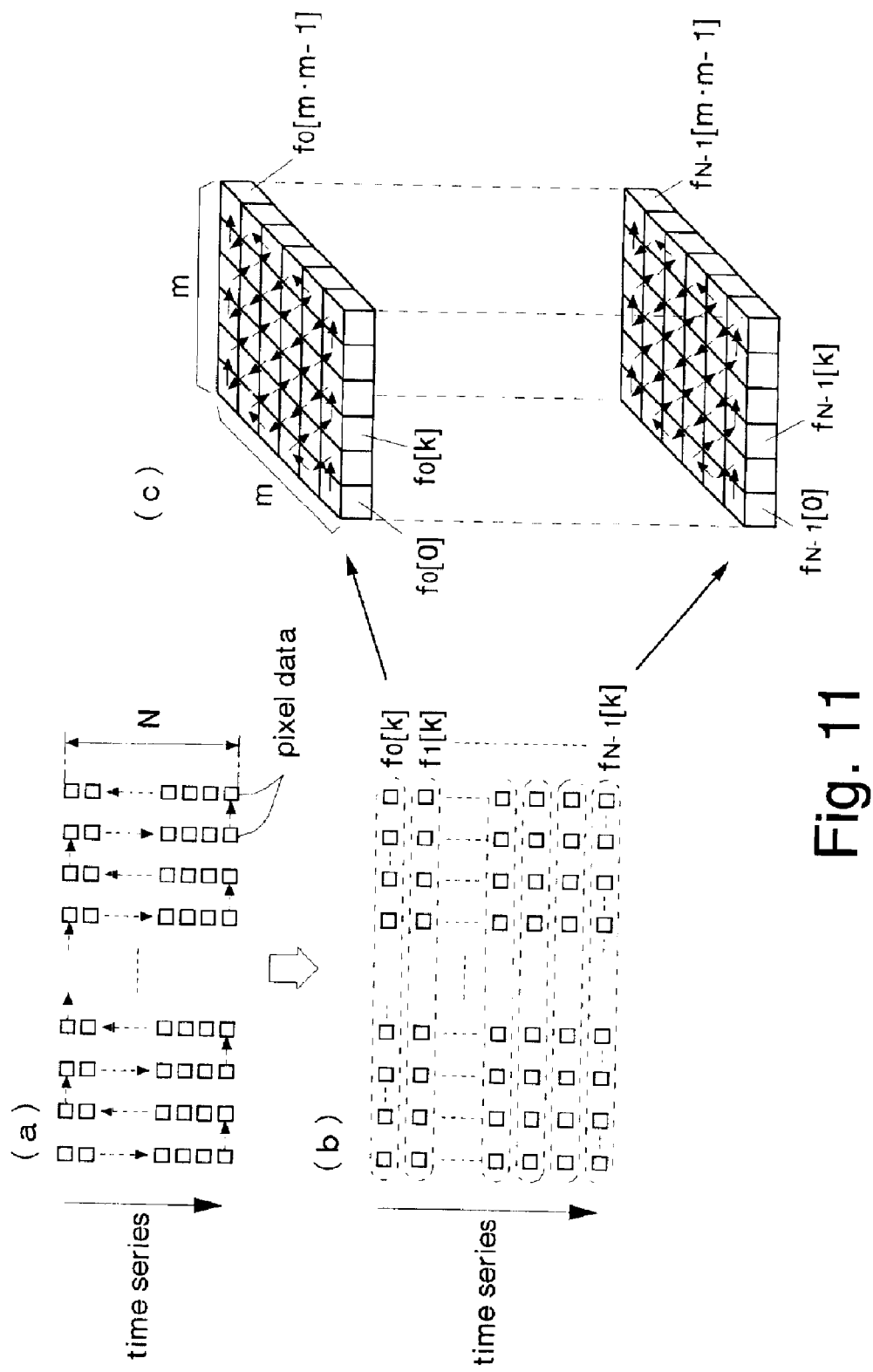
FIG. 11 is an explanatory diagram showing the principles of converting a decoded serial data string into original moving image data in FIG. 10.

FIG. 11 shows the principles of converting a decoded serial data string into original moving image data. Initially, the serial data string is laid so as to turn back with the number of frame images N (frame count N) of the original moving image data as a unit length (FIG. 11(a)). Here, the laid pixel data are arranged in a time-series order to the lower of the diagram. That is, pieces of pixel data along a direction perpendicular to the time series (lateral direction of the diagram) are pixel data of frame images at respective predetermined times.

Next, pieces of pixel data along the lateral direction of the diagram are fetched as a group fi [k] (FIG. 11(b)). Here, "i" is the time series number of the frame image (0 through N–1), and "k" is the position within each frame image (0 through m·m–1).

The pieces of pixel data of the set fi [k] are arranged zigzag in order of the arrows from the lower left to the upper right of the diagram within the frame, so as to restore an m-by-m array of pixel data, or an original frame image (FIG. 11(c)). This is repeated to restore the original moving image data.

Formula for fetching pixel data of an "i" th frame image from a serial data string constituting an array a[j] j=0 through m·m·N–1) are given by the following equations (1) and (2). The equation (1) corresponds to a serial data string arranged in order of time series, and the equation (2) a serial data string arranged in reverse order of time series:

$$fi(2n) = a[i + 2N \cdot n] \quad (1)$$

$$fi(2n+1) = a[i + 2N(n+1) - (2i+1)] \quad (2)$$

Here, "n" is 0, 1, . . . , (m·m–2)/2, and "m" is the number of pixels on a side of a frame image.

From the equations (1) and (2), the arrays a [j] of "i" th (i=0 to N–1) frame images are given as follows:

$$fi(0) = a[i]$$

$$fi(1) = a[2N - (i+1)]$$

$$fi(2) = a[2N + i]$$

$$fi(3) = a[4N - (i+1)]$$

$$\vdots$$

$$fi(m \cdot m - 1) = a[N \cdot m \cdot m - (i+1)].$$

From the foregoing equations, assuming for example that the frame count N is 5 and the number of pixels m on a side of a frame image is 10, the zeroth frame image (initial frame image) is constituted by fetching 0th, 9th, 10th, 19th, 21st, . . . , 499th pixel data out of the serial data string.

As has been described, in the present embodiment, the coded data coded at higher compression efficiency can be restored to its original moving image by a simple method.

Figure 12:
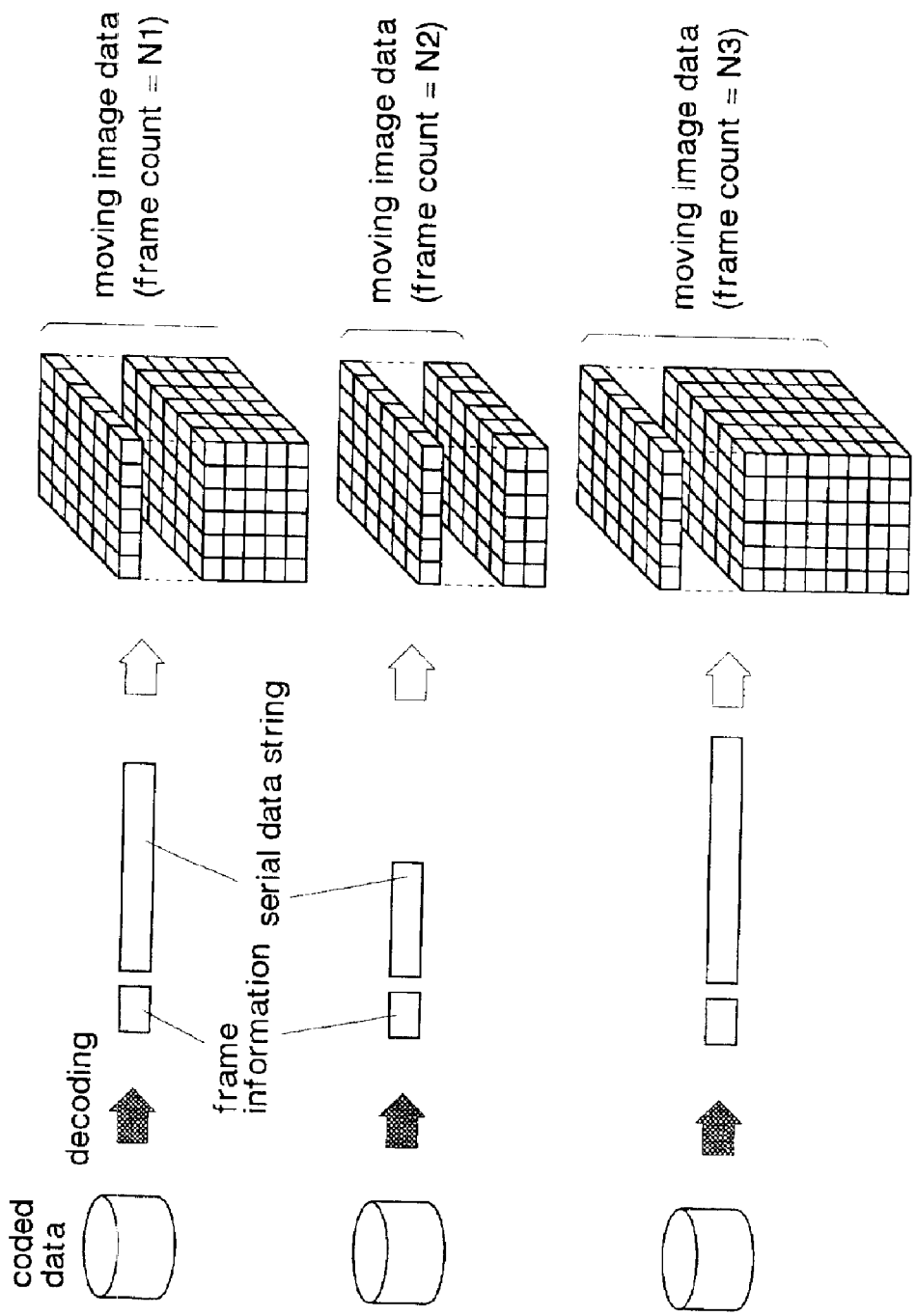
FIG. 12 is an explanatory diagram showing a second embodiment of the method of decoding a moving image, the moving image decoding device, the recording medium storing a program for decoding a moving image, and the recording medium storing coded moving image data.

FIG. 12 shows a second embodiment of the method of decoding a moving image, the moving image decoding device, the recording medium storing a program for decoding a moving image, and the recording medium storing coded moving image data in the present invention. In this embodiment, the program for decoding a moving image differs from that of the first embodiment (FIG. 9). Other configurations in the embodiment are identical to that of FIG. 9.

In this embodiment, the coded data recorded on the DVD-ROM 42 is the pieces of data that are compressed through the procedure shown in FIG. 4 described above.

The pieces of coded data are decoded to generate frame information and serial data strings. The pieces of coded data have been generated, for example, through irreversible compression followed by reversible compression. Alternatively, the pieces of coded data have been generated through either reversible compression or irreversible compression alone.

The serial data strings are laid so as to turn back with the numbers of frame images N of the original moving image data shown by the frame information as unit lengths. Subsequently, under the equations (1) and (2) described above, the serial data strings are formed into frame images of the moving image data to complete the decoding processing.

This embodiment can offer the same effects as those obtained from the above-described first embodiment (FIGS. 9–11) of the method of decoding a moving image, the moving image decoding device, the recording medium storing a program for decoding a moving image, and the recording medium storing coded moving image data.

Figure 13:
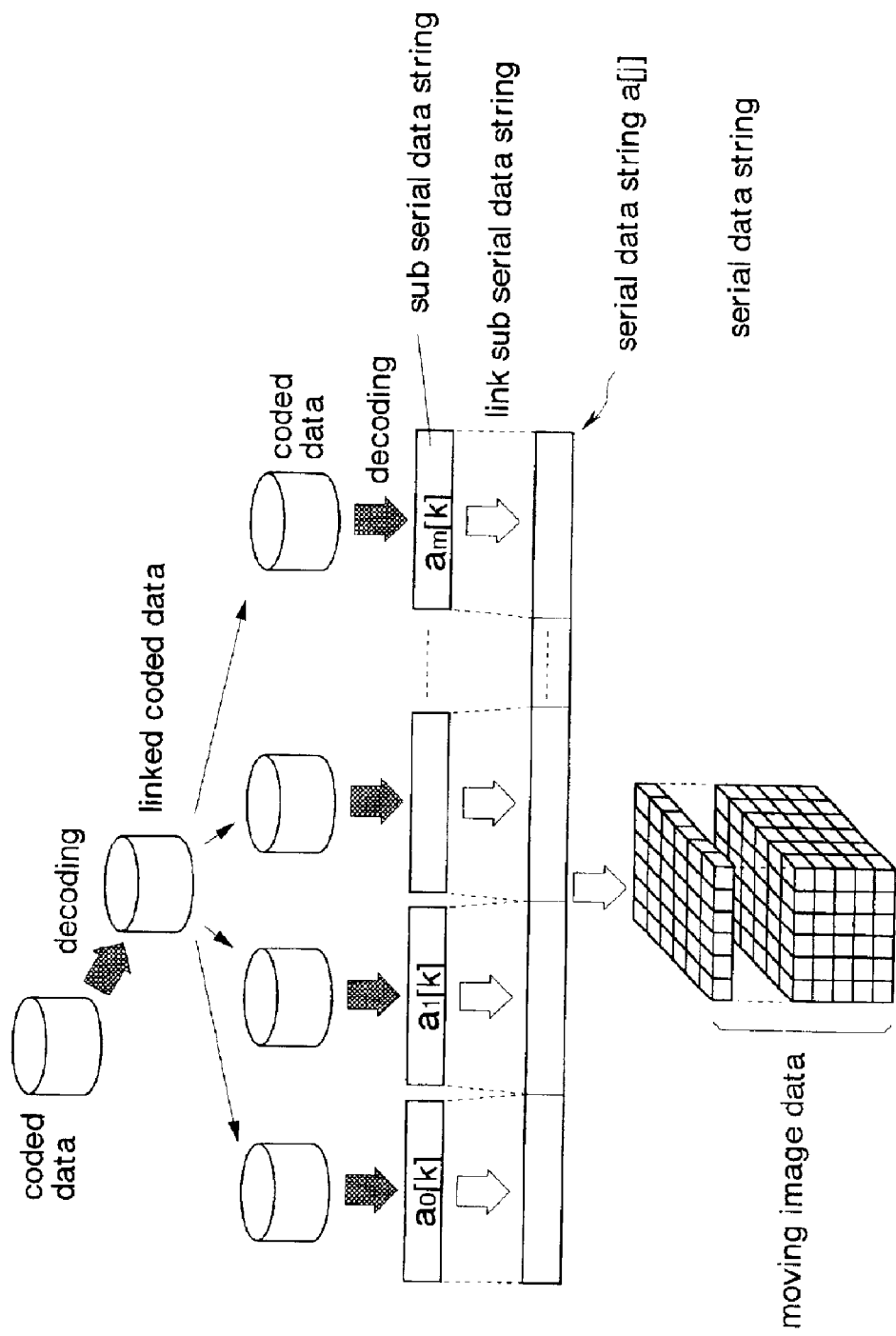
FIG. 13 is a n explanatory diagram showing a third embodiment of the method of decoding a moving image, the moving image decoding device, the recording medium storing a program for decoding a moving image, and the recording medium storing coded moving image data.

FIG. 13 shows a third embodiment of the method of decoding a moving image, the moving image decoding device, the recording medium storing a program for decoding a moving image, and the recording medium storing coded moving image data in the present invention. In this embodiment, the program for decoding a moving image differs from that of the first embodiment (FIG. 9). Other configurations in the embodiment are identical to that of FIG. 9.

In this embodiment, the coded data recorded on the DVD-ROM 42 is the data that is compressed through the procedure shown in FIG. 5 described above.

The coded data (reversible-compressed data) is decoded and converted into linked coded data. The individual pieces of coded data are further decoded and converted into sub serial data strings. The pieces of coded data have been generated, for example, through irreversible compression followed by reversible compression. Alternatively, the pieces of coded data have been generated through either reversible compression or irreversible compression alone.

Here, the CPU 32 shown in FIG. 9 may process the decoding into the sub serial data strings in succession or in parallel. The sub serial data strings are linked into a serial data string. The serial data string is laid so as to turn back with the number of frame images N of the original moving image data as a unit length. Subsequently, under the equations (1) and (2) described above, the serial data string is formed into frame images of the moving image data to complete the decoding processing.

This embodiment can offer the same effects as those obtained from the above-described first embodiment (FIGS. 9–11) of the method of decoding a moving image, the moving image decoding device, the recording medium storing a program for decoding a moving image, and the recording medium storing coded moving image data.

Figure 14:
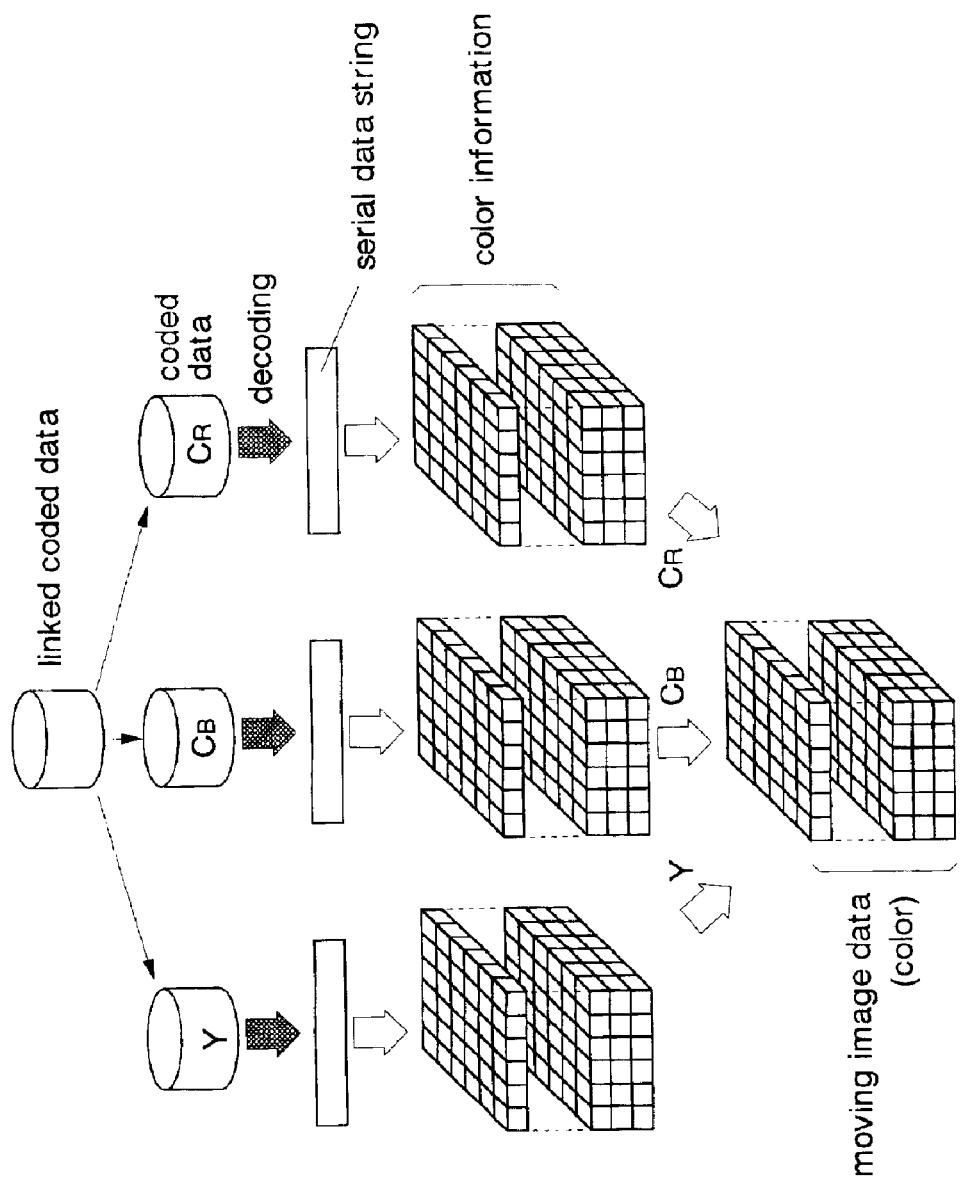
FIG. 14 is an explanatory diagram showing a fourth embodiment of the method of decoding a moving image, the moving image decoding device, the recording medium storing a program for decoding a moving image, and the recording medium storing coded moving image data.

FIG. 14 shows a fourth embodiment of the method of decoding a moving image, the moving image decoding device, the recording medium storing a program for decoding a moving image, and the recording medium storing coded moving image data in the present invention. In this embodiment, the program for decoding a moving image differs from that of the first embodiment (FIG. 9). Other configurations in the embodiment are identical to that of FIG. 9.

In this embodiment, the coded data recorded on the DVD-ROM 42 is the data that is compressed through the procedure shown in FIG. 6 described above. That is, color moving image data is to be decoded.

The linked coded data is divided into pieces of coded data on three kinds of color information (luminance signal Y and color difference signals CB and CR). The pieces of coded data are individually decoded and converted into serial data strings. The pieces of coded data have been generated, for example, through irreversible compression followed by reversible compression. Alternatively, the pieces of coded data have been generated through either reversible compression or irreversible compression alone.

Here, the CPU 32 shown in FIG. 9 may process the decoding of the color information data in succession or in parallel. The serial data strings are laid so as to turn back with the number of frame images N of the original moving image data as a unit length. Subsequently, under the equations (1) and (2) described above, the serial data strings are formed into respective kinds of color information. These kinds of color information are combined to constitute frame images of the moving image data, completing the decoding processing.

This embodiment can offer the same effects as those obtained from the above-described first embodiment (FIGS. 9–11) of the method of decoding a moving image, the moving image decoding device, the recording medium storing a program for decoding a moving image, and the recording medium storing coded moving image data.

Figure 15:
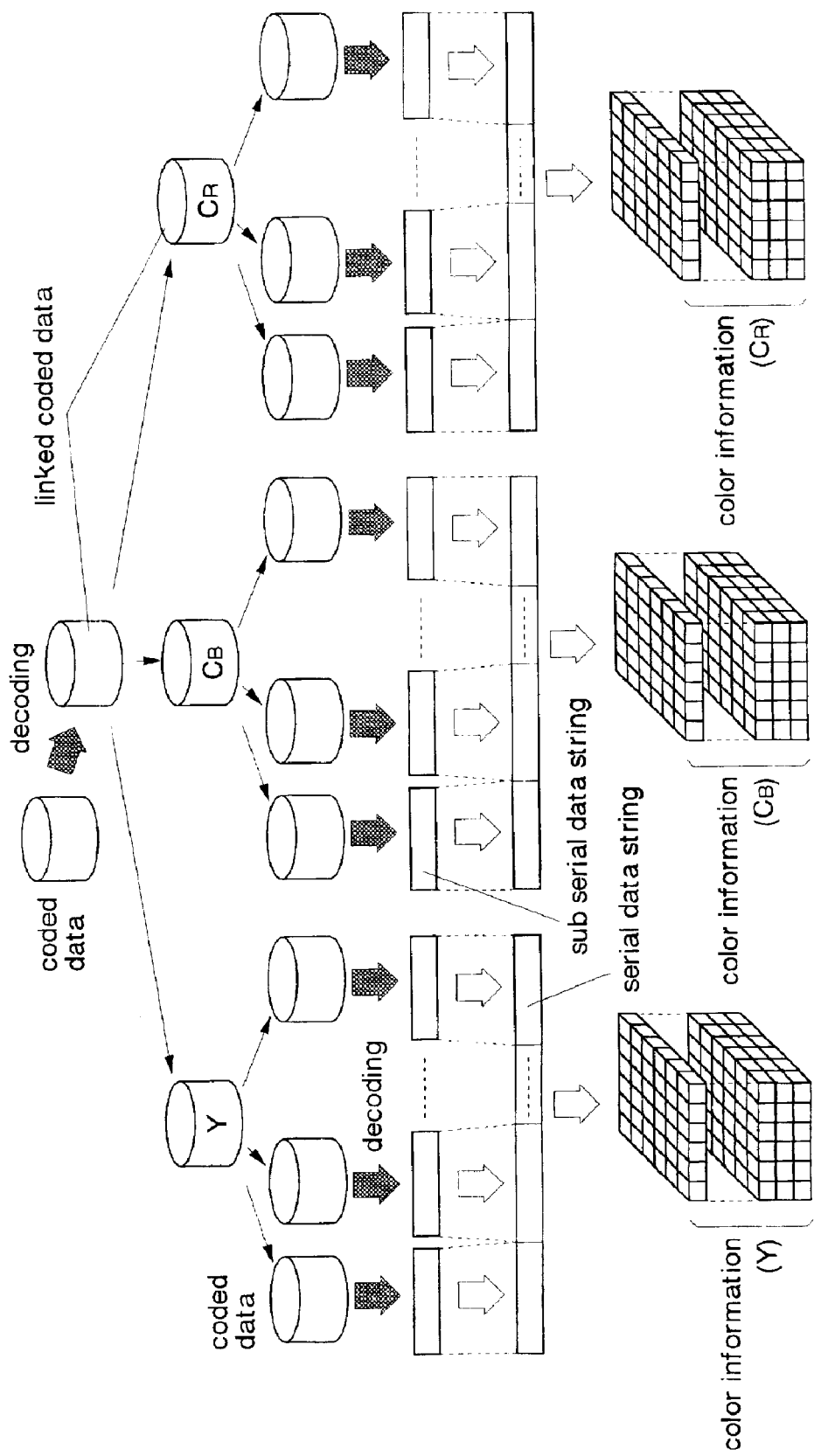
FIG. 15 is an explanatory diagram showing a fifth embodiment of the method of decoding a moving image, the moving image decoding device, the recording medium storing a program for decoding a moving image, and the recording medium storing coded moving image data.

FIG. 15 shows a fifth embodiment of the method of decoding a moving image, the moving image decoding device, the recording medium storing a program for decoding a moving image, and the recording medium storing coded moving image data in the present invention. In this embodiment, the program for decoding a moving image differs from that of the first embodiment (FIG. 9). Other configurations in the embodiment are identical to that of FIG. 9. In this embodiment, the coded data recorded on the DVD-ROM 42 is the data including color information that is compressed through the procedure shown in FIG. 7 described above.

Initially, the coded data (reversible-compressed data) is decoded and then converted into linked data of the pieces of coded data corresponding to the three kinds of color information. Each piece of coded data is further divided into pieces of coded data corresponding to sub serial data strings. The pieces of coded data are decoded and, corresponding to the three kinds of color information, converted into respective sub serial data strings. The pieces of coded data have been generated, for example, through irreversible compression followed by reversible compression. Alternatively, the pieces of coded data have been generated through either reversible compression or irreversible compression alone. Here, the CPU 32 shown in FIG. 9 may process the decoding into the sub serial data strings in succession or in parallel.

Next, the sub serial data strings are linked according to kind of color information to constitute serial data strings. The serial data strings are laid so as to turn back with the number of frame images N of the original moving image data as a unit length. Subsequently, under the equations (1) and (2) described above, the serial data strings are formed into respective kinds of color information. These kinds of color information are combined to constitute frame images of the moving image data, completing the decoding processing.

This embodiment can offer the same effects as those obtained from the above-described first embodiment (FIGS. 9–11) of the method of decoding a moving image, the moving image decoding device, the recording medium storing a program for decoding a moving image, and the recording medium storing coded moving image data.

Incidentally, the second embodiments (FIG. 4, FIG. 12) described above have dealt with the cases where the present invention is applied to a moving image coding device such as a personal computer. However, the present invention is not limited to such embodiments. For example, the present invention may be applied to such moving image coding devices as a visual telephone or a video conference system. In this case, the number of frames can be varied in accordance with the status of the communication line.

The above-described third embodiment (FIG. 5) has dealt with the case where the coding of the sub serial data strings is processed in parallel by the CPU 12. However, the present invention is not limited to such an embodiment. For example, the personal computer 10 may incorporate a plurality of CPUs or a plurality of data processors so that the plurality of processing engines exercise the parallel processing. This also holds to the parallel processing in the other embodiments.

The above-described fourth embodiments (FIG. 6, FIG. 14) have dealt with the cases where color moving image data composed of the luminance signal Y and the color difference signals CB and CR is coded/decoded. However, the present invention is not limited to such embodiments. For example, color moving image data composed of three primary colors R, G, and B may be coded/decoded.

The above-described embodiments have dealt with the cases where the present invention is applied to a personal computer. However, the present invention is not limited to such embodiments. For example, the present invention may be applied to digital videos, digital videocassette recorders, DVD drives, navigation systems, and sensor/simple radar based handicapped guidance systems, as well as digital cameras, cellular phones, hand-held terminals, and the like with moving-image features.

The invention is not limited to the above embodiments and various modifications may be made without departing from the spirit and scope of the invention. Any improvement may be made in part or all of the components.

What is claimed is:

1. A method of coding moving image data composed of a plurality of frame images arranged in time series, comprising the steps of:

constituting a serial data string by
successively fetching pixel data alternately in order of said time series and in order of reverse time series, folding back and forth,
said pixel data each being in a same position on each of said frame image, and
said position fetching to a neighboring pixel data each time said fetching reaches a first or a last of said frame images; and
compression coding said serial data string into coded data.

2. The method of coding a moving image according to claim 1, wherein
said frame images constituting said moving image data is variable in number, and further comprising the step of
compression coding, into coded data, data composed of said serial data string accompanied with frame information indicating the number of said frame images.

3. The method of coding a moving image according to claim 1, comprising the steps of:
dividing said serial data string into a plurality of sub serial data strings; and
compression coding said sub serial data strings into pieces of coded data.

4. The method of coding a moving image according to claim 3, comprising the step of
further compression coding data of said plurality of pieces of coded data linked together.

5. The method of coding a moving image according to claim 3, wherein
said sub serial data strings are compression coded in parallel.

6. The method of coding a moving image according to claim 1, wherein:
said pixel data of said frame images is composed of a plurality of kinds of color information; and
said serial data string is formed according to kind of said color information.

7. The method of coding a moving image according to claim 6, comprising the steps of:
dividing said serial data strings formed for each kind of said color information each into a plurality of sub serial data strings; and
compression coding said sub serial data strings into pieces of coded data.

8. The method of coding a moving image according to claim 6, wherein
said serial data strings are compression coded in parallel.

9. The method of coding a moving image according to claim 1, comprising the steps of:
obtaining frequency components of said serial data string;
decreasing the compression rate of said serial data string when there are more high frequency components than a predetermined value; and
increasing the compression rate of said serial data string when there are less high frequency components than a predetermined value.

10. A method of decoding coded data into original moving image data, said coded data generated by coding the moving image data composed of a plurality of frame images arranged in time series, said coding done by: successively fetching pixel data alternately in order of said time series and in order of reverse time series, folding back and forth; said pixel data each being in a same position on each of said frame images; and said position fetching to a neighboring pixel data each time said fetching reaches a first or a last of said frame images in time series; thus constituting a serial data string; and compression coding said serial data string, the method comprising the steps of:

decoding said coded data to constitute said serial data string;
laying said serial data string out so as to fold back and forth at lengths each having the number of said frame images as a unit;
fetching said pixel data along a direction perpendicular to the direction the pixel data runs in time series, as pieces of pixel data of a same time; and
arranging said fetched pixel data into predetermined positions in frames to constitute said frame images in order of time series.

11. A method of decoding coded data into original moving image data, said coded data generated by coding the moving image data composed of a plurality of frame images arranged in time series, said coding done by: successively fetching pixel data alternately in order of said time series and in order of reverse time series, folding back and forth; said pixel data each being in a same position on each of said frame images; and said position fetching to a neighboring pixel data each time said fetching reaches a first or a last of said frame images in time series; thus constituting a serial data string; and compression coding data composed of said serial data string accompanied with frame information indicating the number of said frame images, the method comprising the steps of:

decoding said coded data to constitute said serial data string and said frame information;
laying said serial data string out so as to fold back and forth at lengths each having said frame information as a unit;
fetching said pixel data along a direction perpendicular to the direction the pixel data runs in time series, as pieces of pixel data of a same time; and
arranging said fetched pixel data into predetermined positions in frames to constitute said frame images in order of time series.

12. A method of decoding coded data into original moving image data, said coded data generated by coding the moving image data composed of a plurality of frame images arranged in time series, said coding done by: successively fetching pixel data alternately in order of said time series and in order of reverse time series, folding back and forth; said pixel data each being in a same position on each of said frame images; and said position fetching to a neighboring pixel data each time said fetching reaches a first or a last of said frame images in time series; dividing said serial data string into a plurality of sub-serial data strings; thus constituting a serial data string; and compression coding each of said sub-serial data strings, the method comprising the steps of:

decoding each of a plurality of said coded data to constitute a plurality of said serial data strings;
linking each of said sub-serial data strings to constitute said serial data string;

laying said serial data string out so as to fold back and forth at lengths each having the number of said frame images as a unit;

fetching said pixel data along a direction perpendicular to the direction the pixel data runs in time series, as pieces of pixel data of a same time; and arranging said fetched pixel data into predetermined positions in frames to constitute said frame images in order of time series.

13. The method of decoding a moving image according to claim 12, wherein said coded data are decoded in parallel.

14. A method of decoding total coded data into original moving image data, said total coded data generated by coding the moving image data composed of a plurality of frame images arranged in time series, said coding done by: successively fetching pixel data alternately in order of said time series and in order of reverse time series, folding back and forth; said pixel data each being in a same position on each of said frame images; and said position fetching to a neighboring pixel data each time said fetching reaches a first or a last of said frame images in time series; thus constituting a serial data string; dividing said serial data string into a plurality of sub-serial data strings; compression coding each of said sub-serial data strings to constitute a plurality of pieces of coded data; and linking said plurality of pieces of coded data to further perform compression coding, the method comprising the steps of:

decoding said total coded data to form said plurality of pieces of coded data;

decoding each of a plurality of said coded data to constitute a plurality of said serial data strings;

linking each of said sub-serial data strings to constitute said serial data string;

laying said serial data string out so as to fold back and forth at lengths each having the number of said frame images as a unit;

fetching said pixel data along a direction perpendicular to the direction the pixel data runs in time series, as pieces of pixel data of a same time; and arranging said fetched pixel data into predetermined positions in frames to constitute said frame images in order of time series.

15. A method of decoding coded data into original moving image data, said coded data generated by coding the moving image data composed of a plurality of frame images arranged in time series and having image data composed of a plurality of kinds of color information, said coding done for each kind of said color information, by: successively fetching color information alternately in order of said time series and in order of reverse time series, folding back and forth; said color information each being in a same position on each of said frame images; and said position fetching to a neighboring color information each time said fetching reaches a first or a last of said frame images in time series; thus constituting serial data strings; and compression coding each of said serial data strings, the method comprising the steps of:

decoding each of a plurality of pieces of said coded data to constitute said serial data string for each kind of color information;

laying each of said serial data strings out so as to fold back and forth at lengths each having the number of said frame images as a unit;

fetching said color information along a direction perpendicular to the direction the pixel data runs in time series, as pieces of color information of a same time;

arranging said fetched color information into predetermined positions in frames to constitute a frame image for each kind of said color information, in order of time series; and linking said color frame information of a same time to constitute said frame image in time series.

16. The method of decoding a moving image according to claim 15, wherein said plurality of pieces of coded data is decoded in parallel.

17. A method of decoding coded data into original moving image data, said coded data generated by coding the moving image data composed of a plurality of frame images arranged in time series and having image data composed of a plurality of kinds of color information, said coding done for each kind of said color information, by: successively fetching color information alternately in order of said time series and in order of reverse time series, folding back and forth; said color information each being in a same position on each of said frame images; and said position fetching to a neighboring color information each time said fetching reaches a first or a last of said frame images in time series; thus constituting serial data strings; dividing said serial data string into a plurality of sub data strings; and compression coding each of said sub serial data strings, the method comprising the steps of:

decoding each of a plurality of pieces of said coded data to constitute a plurality of said sub serial data strings;

linking each of said sub serial data strings according to each kind of said color information to constitute said serial data strings;

laying each of said serial data strings out so as to fold back and forth at lengths each having the number of said frame images as a unit;

fetching said color information along a direction perpendicular to the direction the pixel data runs in time series, as pieces of color information of a same time;

arranging said fetched color information into predetermined positions in frames to constitute a frame image for each kind of said color information, in order of time series; and linking said color frame information of a same time to constitute said frame image in time series.

18. A moving image coding device for coding moving image data composed of a plurality of frame images arranged in time series, wherein said device:

constitutes a serial data string by
successively fetching pixel data alternately in order of said time series and in order of reverse time series, folding back and forth,
said pixel data each being in a same position on each of said frame image, and
said position fetching to a neighboring pixel data each time said fetching reaches a first or a last of said frame images; and compression codes said serial data string into coded data.

19. A moving image coding device for decoding coded data into original moving image data, said coded data generated by coding the moving image data composed of a plurality of frame images arranged in time series, said coding done by: successively fetching pixel data alternately in order of said time series and in order of reverse time series, folding back and forth; said pixel data each being in a same position on each of said frame images; and said position fetching to a neighboring pixel data each time said fetching reaches a first or a last of said frame images in time series; thus constituting a serial data string; and compression coding said serial data string, wherein said device:

decodes said coded data to constitute said serial data string;

lays said serial data string out so as to fold back and forth at lengths each having the number of said frame images as a unit;

fetches said pixel data along a direction perpendicular to the direction the pixel data runs in time series, as pieces of pixel data of a same time; and arranges said fetched pixel data into predetermined positions in frames to constitute said frame images in order of time series.

20. A recording medium storing a computer-readable program for coding moving image data composed of a plurality of frame images arranged in a time series, said program including:

a program for constituting a serial data string by successively fetching pixel data alternately in order of said time series and in order of reverse time series, folding back and forth, said pixel data each being in a same position on each of said frame image, and said position fetching to a neighboring pixel data each time said fetching reaches a first or a last of said frame images; and a program for compression coding said serial data string into coded data.

21. A recording medium storing a computer-readable program for decoding coded data into original moving image data composed of a plurality of frame images arranged in a time series, said coding done by: successively fetching pixel data alternately in order of said time series and in order of reverse time series, folding back and forth; said pixel data each being in a same position on each of said frame images; and said position fetching to a neighboring pixel data each time said fetching reaches a first or a last of said frame images in time series; thus constituting a serial data string; and compression coding said serial data string, said program including:

a program for decoding said coded data to constitute said serial data string;

laying said serial data string out so as to fold back and forth at lengths each having the number of said frame images as a unit;

fetching said pixel data along a direction perpendicular to the direction the pixel data runs in time series, as pieces of pixel data of a same time; and a program for arranging said fetched pixel data into predetermined positions in frames to constitute said frame images in order of time series.

22. A recording medium storing a computer-readable data for coding moving image composed of a plurality of frame images arranged in a time series, said coded moving image data including:

data for constituting a serial data string by successively fetching pixel data alternately in order of said time series and in order of reverse time series, folding back and forth, said pixel data each being in a same position on each of said frame image, and said position fetching to a neighboring pixel data each time said fetching reaches a first or a last of said frame images; and data for compression coding said serial data string into coded data.

* * * * *

UNITED STATES PATENT AND TRADEMARK OFFICE
CERTIFICATE OF CORRECTION

PATENT NO. : 6,895,047 B2
DATED : May 17, 2005
INVENTOR(S) : Ohba Shiro

It is certified that error appears in the above-identified patent and that said Letters Patent is hereby corrected as shown below:

<u>Title page,</u>
Item [56], References Cited, OTHER PUBLICATIONS, change "Zaibi, Rabi, et.al." to -- Zaibi, Rabi et. al. --.

Signed and Sealed this

Twenty-first Day of March, 2006

JON W. DUDAS
*Director of the United States Patent and Trademark Office*